United States Patent [19]

Collins et al.

[11] 4,402,938

[45] Sep. 6, 1983

[54] FOOD AND THE METHOD OF EXTRACTING THE SAME FROM COLOSTRUM AND MILK

[75] Inventors: Mary E. Collins; Robert A. Collins, both of Waukon, Iowa

[73] Assignee: Impro Products, Inc., Waukon, Iowa

[21] Appl. No.: 276,230

[22] Filed: Jun. 22, 1981

Related U.S. Application Data

[63] Continuation-in-part of Ser. No. 154,502, May 29, 1980, abandoned.

[51] Int. Cl.$^3$ .............................................. A61K 39/00
[52] U.S. Cl. ..................................... 424/85; 426/583; 426/491
[58] Field of Search ................. 426/580, 583, 41, 431, 426/491, 495, 657; 424/85, 86, 87

[56] References Cited

U.S. PATENT DOCUMENTS

| | | | |
|---|---|---|---|
| 3,128,230 | 4/1964 | Heinbach | 424/85 |
| 3,646,193 | 2/1972 | Michaelson et al. | 424/85 |
| 3,911,108 | 10/1975 | Singh | 424/86 |
| 3,984,539 | 10/1976 | Khouw et al. | 424/85 X |
| 4,051,235 | 9/1977 | Plymate | 424/85 |
| 4,138,501 | 2/1979 | Chaveron et al. | 426/239 |
| 4,284,623 | 8/1981 | Beck | 424/85 |

OTHER PUBLICATIONS

Webb, B. H., "Fundamentals of Dairy Chemistry", The Avi Publ. Co., Inc., Westport, Conn., 1965, pp. 10 and 416.

Butler, J. E., :37 The Occurrence of Immunoglobulin Fragments, Two Types of Lactoferrin and a Lacto–Ferrin–lgG$_2$ Complex in Bovine Colostral and Milk Whey", Biochimicta et Biophysica Acta, 295, (1973), pp. 341–351.

McDonough, F. E., et al., "Protein Concentrate from Cheese Whey by Ultrafiltration", J. Dairy Sci., vol. 54, No. 10, Oct. 1971, pp. 1406–1409.

*Primary Examiner*—Robert A. Yoncoskie
*Attorney, Agent, or Firm*—Ira Milton Jones

[57] ABSTRACT

This invention provides a new and useful food factor for use as a nutritional supplement for animals, which product comprises whey obtained from colostrum and milk as it comes from selected cows or other ungulates, and containing an active fraction having a molecular weight on the order of 1200 or less.

6 Claims, No Drawings

FOOD AND THE METHOD OF EXTRACTING THE SAME FROM COLOSTRUM AND MILK

This application is a continuation-in-part of the pending application of Mary E. Collins, Ser. No. 154,502, filed May 29, 1980, now abandoned.

It is an object of this invention to produce a new and useful food product comprising whey, by a process which involves the pre-partum introduction of specific antigen-like material into the udder of an ungulate to enhance to an economic level the food factor in whey.

It is another object of the invention to extract, from colostrum and milk from ungulates previously treated with a specific antigen-like material, the whey portion possessing the new food product by a process which entails passage of such whey through a sterilizing filter without denaturing the molecules contained therein.

It is another object of this invention to produce a variety of specific foods by varying the antigen-like material used to activate the udder—such as, but not limited to, pollen, bacteria, virus, mold, allergens, blood from sick animals and sperm.

More specifically, it is a purpose of this invention to produce a food product of the character described which is characterized by an active fraction having a molecular weight of less than 1200.

In one method of practicing our invention, the antigen-like material is introduced into the udder of an ungulate in an asceptic manner two or three times, at weekly intervals during the last month of gestation. This can be accomplished by using a sterile syringe and hypodermic needle, and injecting the material into the side of the udder; or the material can be introduced through the teat canal using a sterile syringe and a blunt plastic needle inserted through the orifice of the teat into the cistern.

At parturition, the ungulate is milked twice daily during the colostrum flow period, and the colostrum is collected in containers and refrigerated, allowing the fat to rise. The fat is then skimmed off. The skimmed colostrum is then frozen to allow storage thereof and to effect a separation of the suspended solids therein.

Milk produced following the colostrum is collected and has the fat removed by centrifugation, as by a cream separator. The resulting skim milk is most conveniently placed in five or ten gallon cans and frozen to effect a separation of the milk curd solids. These solids precipitate better the longer the milk is frozen. The usual freeze period can be sixty days or more. The frozen skim milk can be saved until a suitable size batch is accumulated, usually about fifty to one-hundred (50–100) gallons.

The skimmed colostrum is then removed from the freezer and allowed to thaw gradually at room temperature. The clear liquid is then siphoned off from the colostrum and put in a refrigerated first vat. The remaining slurry is put into a second vat.

Next, the skim milk from the batch is removed from the freezer and allowed to thaw gradually, usually overnight at room temperature. The clear liquid is siphoned off and added to the clear liquid in the first vat containing the clear liquid from the colostrum.

The remaining skim milk slurry is then added to the slurry from the colostrum in the second vat. The temperature of the slurry in the second vat is then raised to about 103° F. to 110° F., which temperature has been found to be best suited for coagulation of the milk curd solids by acid.

Hydrochloric acid (37% USP), diluted 1:10 with distilled water, is slowly added to the second vat while the combined slurries stirred. The acidity of the batch thus formed is then monitored and enough acid added to bring the contents to the desired acidity, which is approximately 4.5 pH. The milk curds (solids) are removed by conventional filtering means so that only the whey portion remains. The whey thus separated from the slurry is then transferred to the refrigerated first vat containing the clear mixture of liquid previously siphoned off from the colostrum and milk.

A preservative such as phenol, parabens, etc., is next added to the refrigerated whey in the first vat. It will be understood, of course, that no more than the maximum allowable quantities of such preservatives are used.

The whey thus produced is further processed through an ultrafiltration unit. Ultrafiltration units outfitted with filtration media of 0.2 micron and smaller have been successfully employed.

Ultrafiltration has been used in the industry for the concentration of protein and lactose in whey, a process in which the filtrate (permeate) is discarded. Our process distinguishes from that previously used in the industry by being the reverse thereof. We use ultra-filtration to remove the protein, globulin, large molecules and contaminates from the whey permeate, a portion of which consists of the desired specific food factors having a molecular weight of <1200, while the remainder contains other factors present in milk and colostrum as it comes from the cow.

Thus, in our process, the filtrate (permeate) is saved and the concentrate or retinate is discarded.

At this point, the filtrate (permeate) containing the desired food factors constituting our new product is further processed by asceptically bottling for direct consumption or by freeze-drying to produce a product in powder form. Ideally, heat substantially above that of the normal body temperature of an ungulate should not be applied to the product for concentration, and the product should not be allowed to reach pasteurizing temperature.

In addition to the specific food factor in the colostrum and milk of the ungulate treated in the manner aforementioned, our new food product also contains numerable factors normally present in colostrum and milk, some of which are viable and all of which are beneficial for animals. At the present time, we do not know the actual identity of our new food product, but its value has been proven by extensive and conclusive tests at the Lobund Institute of the University of Notre Dame.

A report on these tests, now believed to be available, can be found by reference to the official program and abstracts symposium entitled "Gnotobiology for the 80's: Technical and Application" published by "The Association for Gnotobiotics" at their 18th annual meeting held July 10–13, 1980 at the Whitehall Hotel, Houston, Tex. That symposium was hosted by the University of Texas System Cancer Center M. D. Anderson Hospital & Tumor Institute, Texas Medical Center, Houston, Tex. 77030, and the program lists the following abstract:

20. Anticaries Effect on Colostrum Whey from Cows Treated Prepartum with a *Streptococcus mutons* Bacteria via Intramammary Infusion. Morris Wagner, University of Notre Dame, Notre Dame, Ind.

However, it has been determined that the term "specific unknown food factor", as used herein, designates a food factor having a molecular weight of less than 1200. To achieve the desired economic level of this unknown food factor in the colostrum and milk of an ungulate, it is essential to introduce pre-partum into the udder of the ungulate, a specific antigen-like material. Such antigen-like material can comprise (for instance) pollen, bacteria, virus, mold, allergens, blood from sick animals, sperm and toxins.

The presence and amount of this specific unknown food factor in our product has been established by the use of mouse protection studies at the WARF Institute of the University of Wisconsin. The method of measurement—namely, "mouse unit"—is also that which has been established by WARF.

A mouse unit is the minimum amount of our food product obtained from a specific batch, required to protect for a predetermined time a mouse that has been challenged with a lethal dose of the same antigen-like material introduced pre-partum into the udder of the donor ungulate used in the production of said batch. The accepted definition of a mouse unit is contained in the book entitled "Chemistry and Physiology of the Vitamins" by H. R. Rosenberg SC.D., revised reprint 1945; Interscience Publishers Inc. N.Y. NY. Page 24.

We have established that if a mouse unit is 1 cc of our food product:
  (A) 1 cc of our product reduced to a powder by freeze-drying constitutes a mouse unit; and
  (B) 1 cc of our product with all molecules over 1200 M.W. removed also constitutes a mouse unit.

In a more general sense, this invention can be said to reside in introducing pre-partum into the udder of an ungulate a specific antigen-like material, collecting the colostrum and milk after parturition, processing it by extracting the whey therefrom, and filtering the whey through a filter having a pore size preferably not greater than 0.2 microns. The final filtrate contains the desired unknown food factor, along with all factors in whey processed from colostrum and milk as it comes from the treated ungulate.

In addition to the unknown food factor, enhanced to an economic level by the pre-partum introduction of a specific antigen-like material into the udder of an ungulate, our new food product contains other beneficial factors on the order of B Lysin, Conglutinin, Interferon, Lactoferrin, Lactoperoxidase, B Lymphocytes, T Lymphocites, Lysozyme, Macrophages, Polypeptides, Properdin and Thiocyanate that are in the colostrum and milk as it comes from the ungulate and which may be extracted along with the desired unknown specific food factor.

Another satisfactory way of processing the colostrum and milk to extract therefrom the whey containing the specific food factor is to hold the same under refrigeration until the desired batch has been collected, and then passing the colostrum and milk, while at a temperature approximately that of the udder of an ungulate, through a filter that passes only food factors of the molecular weight of the class desired. Again, experience has shown a filter not greater than 0.2 microns to be satisfactory.

In this manner, the food value of the factors is maintained while eliminating contaminants that may be in the milk and colostrum.

In either process described above, the antigen-like material can comprise a solution of 10 cc per teat of the ungulate with each cc having in solution a count of 750 million of the material. This has been found to be most effective when the antigen-like material is comprised of bacteria or virus, but when it comprises the blood of a sick animal, only 5 cc of the blood is injected into each teat.

From the foregoing description, it will be apparent that either process of this invention produces a new and beneficial food product, including specific food factors having a molecular weight of less than 1200, and which food factors have been enhanced by the pre-partum introduction of a specific antigen-like material into the udder of the donor ungulate. In addition, the food product of this invention will contain all the factors present in the colostrum and milk of an ungulate that will pass through a 0.2 micron filter, such as B Lysin, Conglutinin, Interferon, Lactoferrin, Lactoperoxidase, B Lymphocytes, Lysozyme, Macrophages, Polypeptides, Properdin and Thiocyanate. The method of extracting the whey from the colostrum and milk as herein described also eliminates the contaminants normally present therein.

The invention is defined by the following claims:

We claim:

1. The method of producing a food product, comprising the steps of:
  A. introducing pre-partum into the udder of an ungulate a specific antigen-like material selected from the group consisting of pollen, bacteria, virus, mold, allergens, blood from sick animals, sperm and toxins;
  B. removing secretory fluid from the udder of the ungulate thus treated;
  C. removing the fat and solids from said secretory fluid so that only whey remains;
  D. and passing said whey through a filter having a pore size of about 0.2 microns to effect separation from said whey of large molecules to produce a purified whey a portion of which consists of a food factor resulting from the introduction of said antigen-like material and having a molecular weight on the order of 1200 or less.

2. A product produced by the practice of claim 1.

3. The method of claim 1, wherein said secretory fluid comprises colostrum and milk.

4. A product produced by the method of claim 3.

5. The method of producing a food product comprising the steps of:
  A. introducing pre-partum into the udder of an ungulate a specific antigen-like material selected from the group consisting of pollen, bacteria, virus, mold, allergens, blood from sick animals, sperm and toxins;
  B. removing colostrum and milk from the udder of the ungulate thus treated;
  C. separating the fat from the colostrum and milk;
  D. thereafter freezing the colostrum and milk to effect precipitation of the milk curd solids therein;
  E. gradually thawing said frozen colostrum and milk;
  F. siphoning off clear whey from the thawed colostrum and milk;
  G. heating the remaining slurry portion of the colostrum and milk to a temperature of approximately 103° to 110° F.;
  H. mixing a dilute acid with said remaining slurry portion to produce a pH that causes coagulation of the milk curd solids therein;

I. separating said solids from the slurry so that only whey remains;
J. blending such remaining whey with the whey portion previously siphoned off;
K. and filtering said blend through a filter media having a pore size of about 0.2 microns to produce a whey permeate a fraction of which consists of a food substance resulting from the introduction of said antigen-like material and having a molecular weight of 1200 or less.

6. A product produced by the method of claim 5.

* * * * *